(12) United States Patent
Emberty et al.

(10) Patent No.: US 6,401,475 B1
(45) Date of Patent: Jun. 11, 2002

(54) TEMPERATURE ADJUSTMENT MODULE AND METHOD USING SAME

(75) Inventors: Robert George Emberty; Craig Anthony Klein, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/840,654

(22) Filed: Apr. 23, 2001

(51) Int. Cl.⁷ .............................................. F25D 23/12
(52) U.S. Cl. ................. 62/259.2; 165/80.4; 165/104.33
(58) Field of Search ..................... 62/259.2; 165/104.33, 165/80.4; 361/695, 690, 694

(56) References Cited

U.S. PATENT DOCUMENTS

| | | | |
|---|---|---|---|
| 4,899,254 A | 2/1990 | Ferchau et al. | 361/384 |
| 5,340,340 A | 8/1994 | Hastings et al. | 439/64 |
| 5,424,916 A | 6/1995 | Martin | 361/698 |
| 5,559,982 A | 9/1996 | Wideman | 395/438 |
| 5,606,467 A | 2/1997 | Hirata | 360/69 |
| 5,646,816 A | 7/1997 | Alden et al. | 361/622 |
| 5,822,184 A | 10/1998 | Rabinovitz | 361/685 |
| 5,872,672 A | 2/1999 | Chliwnyj et al. | 360/77.12 |
| 5,955,955 A | 9/1999 | Corcoran, Jr. et al. | 340/607 |
| 6,018,456 A | 1/2000 | Young et al. | 361/684 |
| 6,038,126 A | 3/2000 | Weng | 361/679 |
| 6,040,981 A | 3/2000 | Schmitt et al. | 361/695 |
| 6,061,244 A | 5/2000 | O'Sullivan et al. | 361/727 |
| 6,075,698 A | 6/2000 | Hogan et al. | 361/695 |
| 6,098,131 A | 8/2000 | Unger et al. | 710/101 |
| 6,115,250 A | 9/2000 | Schmitt | 361/695 |
| 6,141,211 A | 10/2000 | Strickler et al. | 361/685 |
| 6,148,352 A | 11/2000 | Coale et al. | 710/100 |
| 6,182,742 B1 | 2/2001 | Takahashi et al. | 165/104.33 |

Primary Examiner—William Doerrler
Assistant Examiner—Melvin Jones
(74) Attorney, Agent, or Firm—Dale F. Regelman

(57) ABSTRACT

A temperature adjustment module removably disposed within an automated data storage and retrieval system. An automated data storage and retrieval system which includes one or more temperature adjustment modules removably disposed therein. An accessor movably disposed with an automated data storage and retrieval system comprising a gripper mechanism which can be releaseably attached to a temperature adjustment module. A method to operate a temperature adjustment module removably disposed within an automated data storage and retrieval system. A method to monitor the operation of a temperature adjustment module removably disposed within an automated data storage and retrieval system.

36 Claims, 10 Drawing Sheets

TEMPERATURE ADJUSTMENT MODULE AND METHOD USING SAME

FIELD OF THE INVENTION

The present invention relates to a temperature adjustment module removably disposed within an automated data storage and retrival system, an automated data storage and retrieval system which includes one or more removable temperature adjustment modules, a method to adjust the temperature within an automated data storage and retrieval system, and a method to monitor the performance of a temperature adjustment module removably disposed within an automated data storage and retrieval system.

BACKGROUND OF THE INVENTION

Automated media storage libraries are known for providing cost effective access to large quantities of stored media. Generally, media storage libraies include a large number of storage slots on which are stored portable data storage media. The typical portable data storage media is a tape cartridge, an optical cartridge, a disk cartridge, and the like. One (or more) accessor typically accesses the data storage media from the storage slots and delivers the accessed media to a data storage drive for reading and/or writing data on the accessed media. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy.

The individual components forming such an automated data storage and retrieval system generated heat when in operation. In order to prevent one or more of those components failing because of excess operating temperatures, temperature adjustment equipment and methods are conventionally used. Such temperature adjustment equipment generally includes one or more fan units. Optionally, such temperature adjustment equipment may also include a system to circulate a cooling liquid to one or more heat exchanger units disposed within the automated data storage and retrieval system.

Conventional cooling apparatuses for cooling electronic systems circulate a cooling liquid in a liquid-cooled electronic system as a computer to cool the load. However, in these prior-art systems, the cooling apparatus cannot be serviced when the electronic system, such as an automated data storage and retrieval system, is in operation.

Recently, there is a strong demand for an around-the-clock operational capability for such automated data storage and retrieval systems. This results in a need for a portable and removable temperature adjustment module, and a method to evaluate the performance of such a module while that module is in operation, and if need, a method to remove and replace a malfunctioning module. Applicants' temperature adjustment module, and method to use same, allows such around-the-clock operation of Applicants' automated data storage and retrieval system.

SUMMARY OF THE INVENTION

Applicants' invention includes a temperature adjustment module removably disposed in Applicants' automated data storage and retrieval system. Applicants' temperature adjustment module includes a frame, one or more fan units disposed within that frame, at least one attachment device disposed on the frame, and at least one electrical connector disposed on the frame which can be releasably connected to a power connection device. In certain embodiments the connector disposed on the frame comprises an electrical/data connector which can be releaseably connected to a power connection/data connection device.

In certain embodiments, Applicants' temperature adjustment module further includes a heat exchanger disposed within an enclosure connected to said frame. In certain embodiments, Applicants' temperature adjustment module further includes a separate data interface disposed on the frame.

Applicants' invention further includes an automated data storage and retrieval system for storing and accessing a plurality of portable data storage media stored in a plurality of storage slots. Applicants' automated data storage and retrieval system includes one or more temperature adjustment module receiving slots, one more of Applicants' temperature adjustment modules removably disposed in those one more of those power supply module receiving slots, one or more power connection devices, and one or more accessors for accessing, transporting, and storing Applicants' temperature adjustment modules. Each of these accessors each includes at least one gripper mechanism for releaseably attaching Applicants' temperature adjustment module to the accessor. In certain embodiments, Applicants' accessors include a information receiving device and a memory buffer.

Applicants' invention includes a method to store, transport, and operate Applicants' temperature adjustment modules. Applicants' method includes steps to removably dispose a temperature adjustment module in one or more of the available temperature adjustment module receiving slots, supply power to that temperature adjustment module, and operate that temperature adjustment module. Applicants' automated data storage and retrieval system includes a computer useable medium having computer readable program code disposed in Applicants' automated data storage and retrieval system to implement Applicants' method to store, transport, and operate Applicants' temperature adjustment module.

Applicants' invention further includes a method to monitor the performance of one of Applicants' temperature adjustment modules removably disposed within Applicants' automated data storage and retrieval system, and if necessary, to remove and replace a malfunctioning module. Applicants' automated data storage and retrieval system includes a computer useable medium having computer readable program code disposed in Applicants' to implement Applicants' method to monitor performance.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
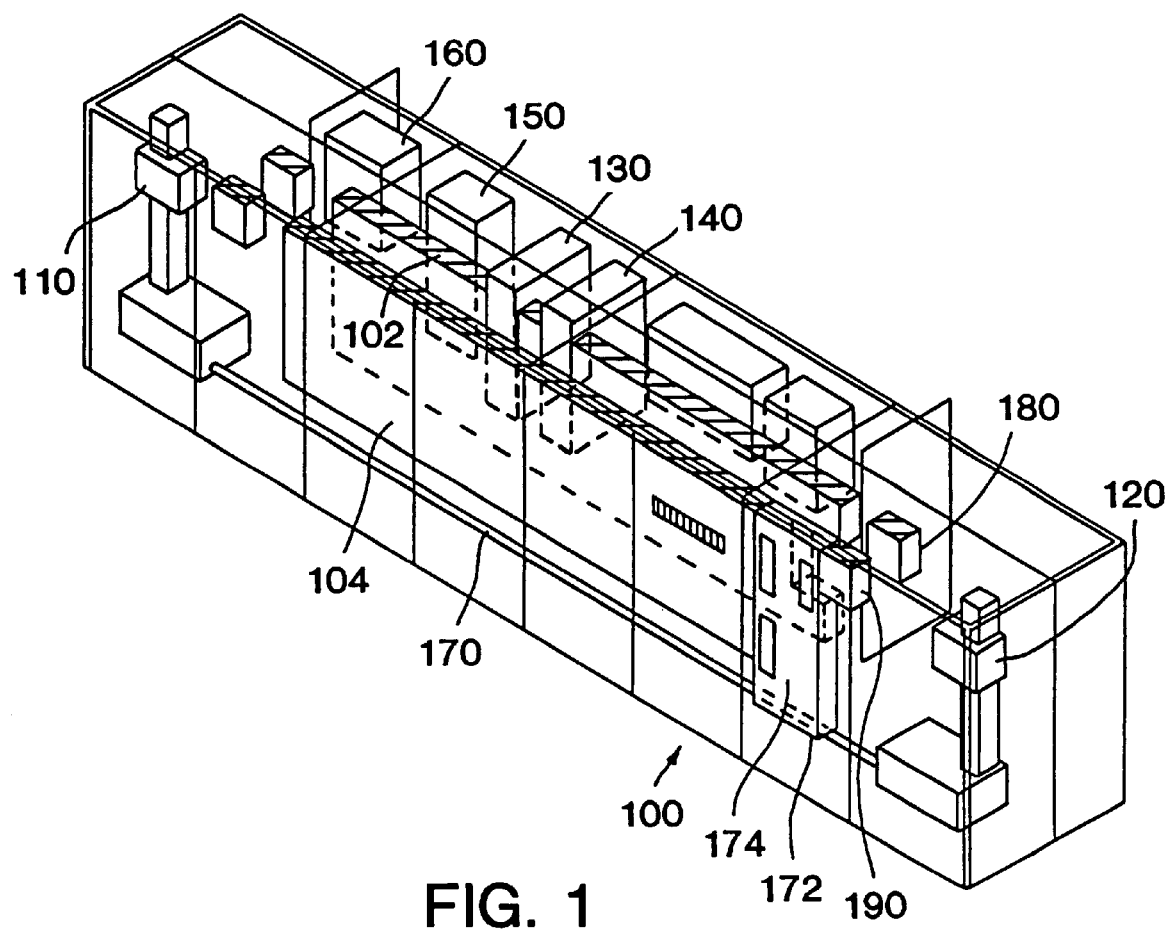
FIG. 1 is a perspective view of Applicants' automated data storage system.

Referring to FIG. 1, Applicants' automated data storage and retrieval system 100 is shown having a first wall of storage slots 102 and a second wall of storage slots 104. Data storage media are individually stored in these storage slots. The data storage media are housed within a portable container, i.e. a cartridge. Examples of such data storage media include magnetic tapes, optical disks of various types, including ROM, WORM, and rewritable, and the like.

Applicants' automated data storage and retrieval system includes one or more accessors, such as accessors 110 and 120. An accessor is a robotic device which accesses portable data storage media from first storage wall 102 or second storage wall 104, delivers that accessed media to data storage drives 130/140 for reading and/or writing data thereon, and returns the media to the proper storage slot.

In addition, and as described below, accessors 110/120 also access and transport stored portable temperature adjustment modules disposed in first storage wall 102 and/or second storage wall 104. First storage wall 102 comprises a plurality of storage slots in which are stored, for example, portable data storage media and/or stored portable temperature adjustment modules. Second storage wall 104 comprises a plurality of storage slots in which are stored, for example, portable data storage media and/or stored portable temperature adjustment modules.

As shown in FIG. 1, accessors 110 and 120 travel bi-directionally along rail 170 in an aisle disposed between first wall of storage slots 102 and second wall of storage slots 104. Library controller 160 controls accessors 110 and 120. Operator input station 150 permits an operator to communicate with Applicants' automated data storage and retrieval system 100. Power component 180 and power component 190 each comprise one or more power supply units which supply power to the individual components disposed within Applicants' automated data storage and retrieval system.

Import/export port 172 include access door 174 pivotably attached to the side of system 100. Portable data storage cartridges can be placed in the system, or in the alternative, removed from the system, via port 172/access door 174. In addition, Applicants' temperature adjustment module(s) can be inserted into the system, or removed from the system, via port 172/access door 174.

Figure 2:
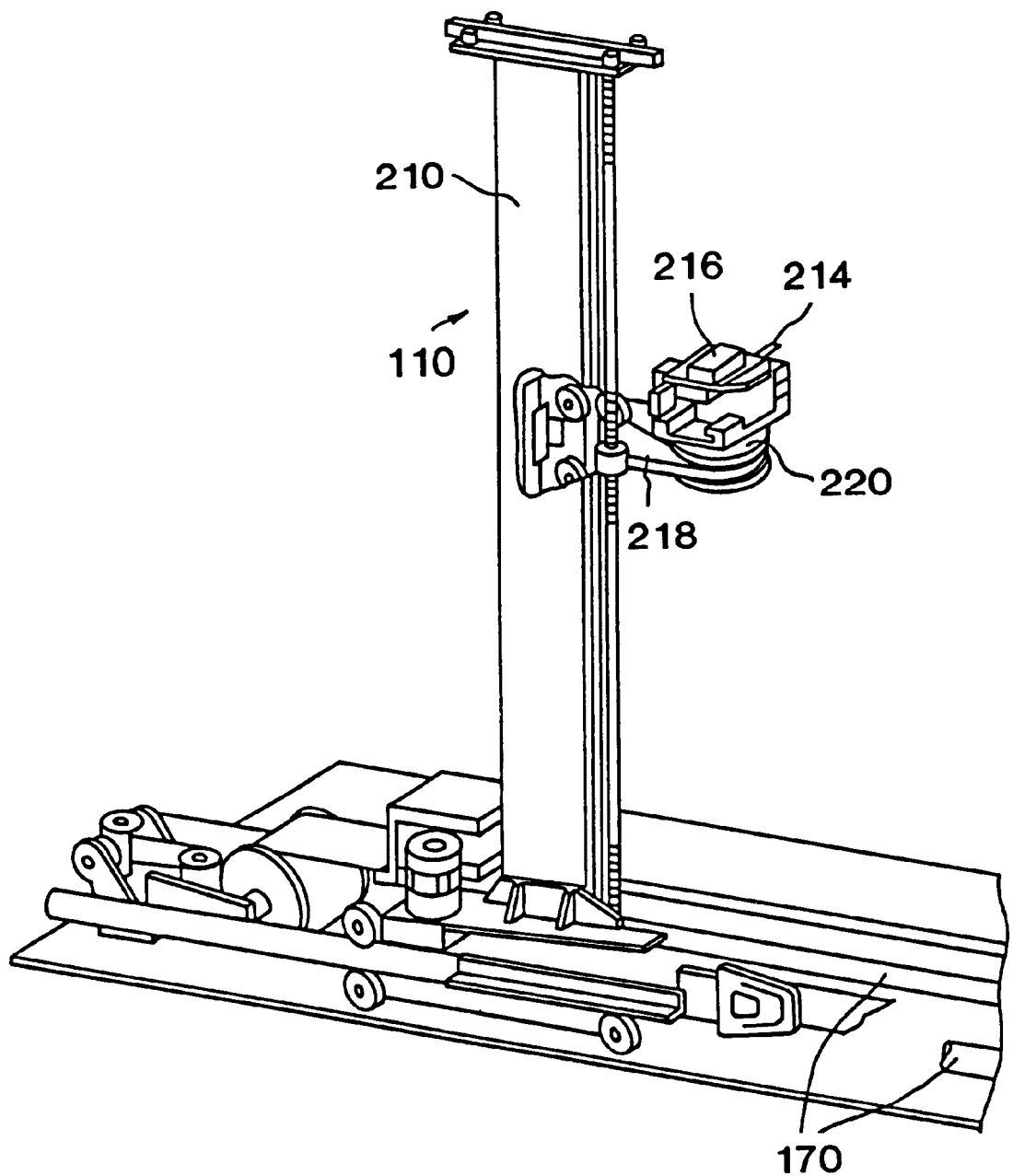
FIG. 2 is a perspective view of one embodiment of Applicants' accessor showing the gripper mechanism and the information receiving device.

Referring to FIG. 2, accessor 110 travels bi-directionally along rail system 170. In the embodiment shown in FIG. 2, rail system 170 comprises two parallel rails. Accessor 110 includes vertical pillar 210. Lifting servo section 218 moves vertically along pillar 210. Accessor 110 includes first gripper mechanism 214, second gripper mechanism 220, and information receiving device 216.

Figure 3:
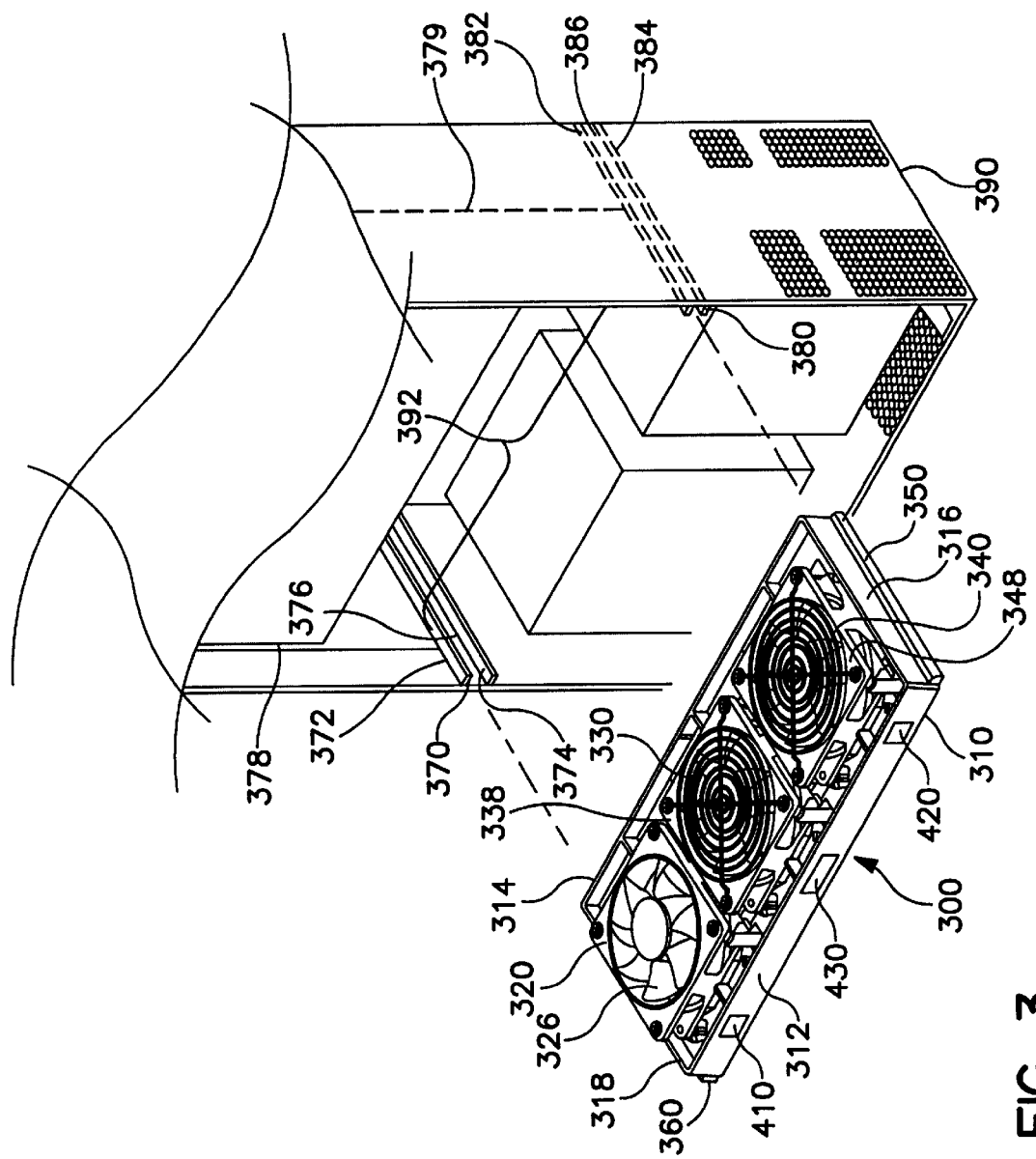
FIG. 3 is a perspective view of one embodiment of Applicants' removable temperature adjustment module and associated temperature adjustment module receiving slot.

FIG. 3 shows temperature adjustment module 300 in relation to apparatus 390. Apparatus 390 includes data storage drive 130 (FIG. 1), data storage drive 140 (FIG. 1), operator control panel 150 (FIG. 1), accessor controller 160 (FIG. 1), power supply component 180 (FIG. 1), and/or power supply component 190 (FIG. 1).

Temperature adjustment module 300 comprises frame 310 which includes first side 312 opposing second side 314, third side 316 and opposing fourth side 318. In certain embodiments frame 310 has dimensions, i.e. length, width, and depth, that correspond to the dimensioned of the portable data storage cartridges movably disposed within system 100. Those skilled in the art will appreciate that temperature adjustment modules having these dimensions can be stored the storage slots disposed in first storage wall 102 (FIG. 1) and/or second storage wall 104 (FIG. 1).

Connector 350 is disposed along side 316. In the embodiment shown in FIG. 3, connector 350 comprises a member having a square cross-section. In other embodiments, connector 350 comprises a member having a triangular,circular, ovoid, pentagonal, or hexagonal cross-section.

Connector 350 slidingly mates with assembly 380 which is disposed within apparatus 390. Assembly 380 comprises top member 382 and bottom member 384 which are separated by gap 386. In the embodiment shown in FIG. 3, top member 382 and bottom member 384 comprises members having a square cross-section, and assembly 380 comprises a U-shaped device. The descriptors "top" and "bottom" are used for purposes of description only, and should not be construed as limiting. In other embodiments, the configuration of members 382 and 384, and the size and shape of gap 386, are adjusted to slidingly receive the embodiments of connector 350 recited above.

Connector 360 is disposed along side 318. In the embodiment shown in FIG. 3, connector 360 comprises a member having a square cross-section. In other embodiments, connector 360 comprises a member having a triangular, rectangular, pentagonal, circular, ovoid, or hexagonal cross-section.

Connector 360 slidingly mates with assembly 370 which is disposed within apparatus 390. Assembly 370 comprises top member 372 and bottom member 374 which are separated by gap 376. In the embodiment shown in FIG. 3, top member 372 and bottom member 374 comprises members having a square cross-section, and assembly 370 comprises a U-shaped device. The descriptors "top" and "bottom" are used for purposes of description only, and should not be construed as limiting. In other embodiments, the configuration of members 372 and 374, and the size and shape of gap 376, are adjusted to slidingly receive the embodiments of connector 360 recited above.

In the embodiment shown in FIG. 3, connector 350 and connector 360 have a similar size and configuration. Similarly, in the embodiment shown in FIG. 3, assemblies 370 and 380 have a similar size and configuration. In alternative embodiments, the sizes and/or configurations of connectors 350 and 360 differ from one another. In these alternative embodiments, the sizes and/or configurations of assemblies 370 and 380 differ from one another.

Assembly 370 in combination with assembly 380 comprises temperature adjustment module receiving slot 392. Temperature adjustment module receiving slot 392 provides an assembly wherein temperature adjustment module 300 can be removably disposed. In the embodiment shown in FIG. 3, temperature adjustment module receiving slot 392 also comprises two releaseable electrical connectors. For example, assembly 370 is in electrical contact with conductor 378. Conductor 378 is in electrical contact with a power bus (not shown in FIG. 3) disposed within system 100 (FIG. 1). Thus in the embodiment shown in FIG. 3, assembly 370 comprises a power connection device. Assembly 380 is in electrical contact with conductor 379. Conductor 379 is in electrical contact with a system-wide electrical ground (not shown in FIG. 3) disposed within system 100.

In certain embodiments, assembly 370 comprises a power connection device in combination with a data connection device. For example, top member 372 comprises power connection device component 373 (not shown in FIG. 3) and data connection device component 375 (not shown in FIG. 3). In these embodiments, conductor 378 includes power component 378A (not shown in FIG. 3) which interconnects a power bus disposed within system 100 with power connection device component 373, in combination with data path component 378B which interconnects library controller 160 and data connection device component 375.

In these power/data connector embodiments, connector 360 includes power component 362 (not shown in FIG. 3) and data component 364 (not shown in FIG. 3). Connector 360 slidingly mates with assembly 370 such that power connection device component 373 releaseably couples to power component 363, and such that data connection device component 375 releaseably couples to data component 364.

Temperature adjustment module 300 includes fan unit 320, fan unit 330, and fan unit 340. In an alternative embodiment, Applicants' temperature adjustment module includes a single fan unit. In another alternative embodiment, Applicants' temperature adjustment module includes two fan units.

Fan unit 320 includes motor 322 (not shown in FIG. 3, external shaft 324 (not shown in FIG. 3), and fan blade 326. External shaft 324 connects motor 322 and fan blade 326. When power is supplied to motor 322, motor 322 causes external shaft 324 to rotate which, in turn, causes flan blade 326 to rotate. In certain embodiments, motor 322 is an AC motor. In alternative embodiments, motor 322 is a DC motor. Fan unit 320 has a first orientation wherein air is drawn through the bottom portion of module 300 and is exhausted from the top portion of module 300. Fan unit 320 has a second orientation wherein air is drawn from the top portion of module 300 and is exhausted through the bottom portion of module 300.

Fan unit 330 includes motor 332 (not shown in FIG. 3, external shaft 334 (not shown in FIG. 3), fan blade 336, and fan blade guard 338. External shaft 334 connects motor 332 and fan blade 336. When power is supplied to motor 332, motor 332 causes external shaft 334 to rotate which, in turn, causes flan blade 336 to rotate. In certain embodiments, motor 332 is an AC motor. In alternative embodiments, motor 332 is a DC motor. Fan unit 330 has a first orientation wherein air is drawn through the bottom portion of module 300 and is exhausted from the top portion of module 300. Fan unit 330 has a second orientation wherein air is drawn from the top portion of module 300 and is exhausted through the bottom portion of module 300.

Fan unit 340 includes motor 342 (not shown in FIG. 3), external shaft 344 (not shown in FIG. 3), fan blade 346, and fan blade guard 348. External shaft 344 connects motor 342 and fan blade 346. When power is supplied to motor 342, motor 342 causes external shaft 344 to rotate which, in turn, causes flan blade 346 to rotate. In certain embodiments, motor 342 is an AC motor. In alternative embodiments, motor 342 is a DC motor. Fan unit 340 has a first orientation wherein air is drawn through the bottom portion of module 300 and is exhausted from the top portion of module 300. Fan unit 340 has a second orientation wherein air is drawn from the top portion of module 300 and is exhausted through the bottom portion of module 300.

Fan blades 326, 336, and 346 may have similar sizes or may differ in size. Generally, fan units 320, 330, and 340 are disposed within module 300 such that those individual units each have the same operational orientation.

Increasing the power supplied to motors 322, 332, and/or 342 causes fan blades 326, 336, and/or 346, respectively, to rotate faster. As those skilled in the art will appreciate, a faster rotation of a fan blade results in an increased movement of air through that fan unit.

Connector 360 is in electrical contact with motors 322, 332, and 342 via conductors 327 (not shown in FIG. 3), 337 (not shown in FIG. 3), and 347 (not shown in FIG. 3), respectively. Connector 350 is in electrical contact with motors 322, 332, and 342 via conductors 328 (not shown in FIG. 3), 338 (not shown in FIG. 3), and 348 (not shown in FIG. 3), respectively. When temperature adjustment module 300 is slidingly mated with temperature adjustment module receiving slot 392, power is supplied to fan units 320, 330, and 340.

Referring to FIG. 3, first attachment device 410 is disposed on first side 312. In certain embodiments, first attachment device comprises a parallelepiped having one face disposed on first side 312 and extending outwardly therefrom. In other embodiments, first attachment device comprises a cylinder having one end disposed on first side 312 and extending outwardly therefrom. In other embodiments, first attachment device 410 comprises an aperture disposed through first side 312. In these embodiments, the shape of the aperture is selected from the group consisting of a cube, a parallelepiped, and a cylinder.

In the embodiment shown in FIG. 3, removable temperature adjustment module 300 includes a second attachment device, namely second attachment device 420 disposed on first side 312. In certain embodiments, second attachment device 420 comprises a parallelepiped having one face disposed on first side 312 and extending outwardly therefrom. In alternative embodiments, second attachment device 420 comprises a cylinder having one end disposed on first side 312 and extending outwardly therefrom. In yet other embodiments, second attachment device 420 comprises an aperture disposed through first side 312. In these embodiments, the shape of the aperture is selected from the group consisting of a cube, a parallelepiped, and a cylinder. In embodiments having two attachment devices disposed on frame 310, those two attachment devices may be of the same type, i.e. a member extending outwardly from side 312 or an aperture disposed in side 312, and of the same dimension, or those two attachment devices may differ in type, dimension, or both.

Data interface 430 is disposed on first side 312 of removable temperature adjustment module 300. When temperature adjustment module 300 is removeably attached to first gripper mechanism 214 (FIG. 2) disposed on accessor 110 (FIGS. 1, 2), data interface 430 is disposed adjacent information receiving device 216 such that information receiving device 216 can download first information from temperature adjustment module 300 while module 300 is disposed in, and operating in, apparatus 390. Such first information includes input power, fan blade speed, air temperature, and the like.

The interconnection between data interface 430 and information receiving device 216 can comprise a physical connection or a wireless communication link. In one embodiment, data interface 430 includes one or more input/output terminals disposed flush with the surface of frame 310. In this embodiment, information receiving device 216 releaseably connects to those input/output terminals thereby allowing the transfer of information. U.S. Pat. No. 5,606,467 describes such an interconnection between such input/output terminals and a memory reading device, and is hereby incorporated by reference.

In alternative embodiments, information is passed from data interface 430 to information receiving device 216 using a contactless interface. In certain embodiments, such a contactless interface comprises a contactless radio frequency interface. In these embodiments, this radio frequency interface provides read/write access to data interface 430. In these embodiments, data interface 430 comprises an EEPROM containing 4,096 bytes organized as 128 32-byte accessible blocks. In these embodiments, information receiving device 216 generates an operating field. This operating field is modulated by both data interface 430 and information receiving device 216 to enable contactless communication between those devices.

In one embodiment, the operating field has a frequency of about 13,560 kHz±7 kHz. The minimum field strength is about 5 A/m and the maximum field strength is about 15 A/m. Information receiving device 216 communicates with data interface 430 by amplitude modulating the operating field. Data interface 430 communicates with information receiving device 216 by load modulating the operating field with a subcarrier having a subcarrier frequency equal to about fc/16. As those skilled in the art will appreciate, load modulation is the process of amplitude modulating a radio frequency field by varying the properties of a resonant circuit placed within the radio frequency field.

Figure 4A:
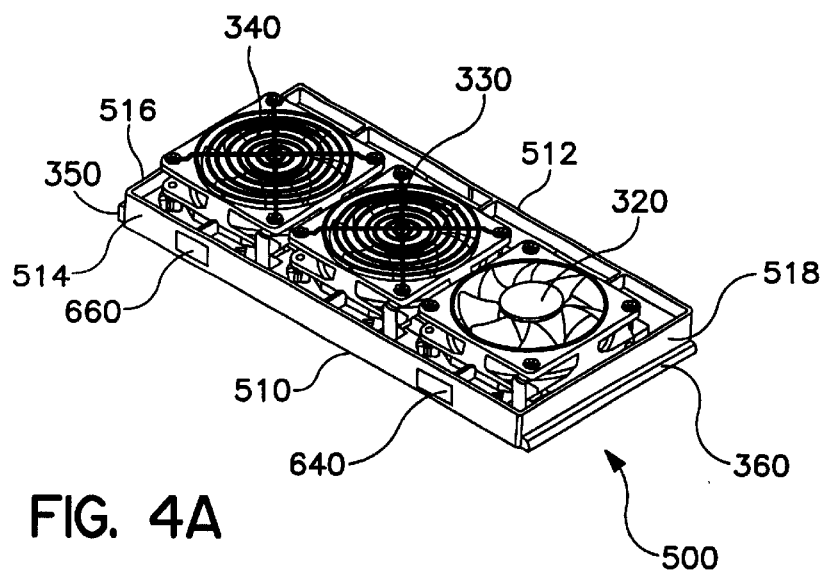
FIG. 4A is a perspective view of a second embodiment of Applicants' removable temperature adjustment module.

Referring to FIG. 4A, temperature adjustment module 500 includes frame 510 which is formed from first side 512 and opposing second side 514, third side 516 and opposing fourth side 518. Temperature adjustment module 500 includes connectors 350 and 360 disposed on sides 516 and 518, respectively. Connector 550 slidingly mates with assembly 380, and connector 560 slidingly mates with assembly 370. Assembly 370 and assembly 380 in combination form temperature adjustment module receiving slot 392 disposed within apparatus 390.

Connector 640 is disposed on second side 514 of module 500. Connector 640 is in electrical contact with fan units 320, 330, and 340. Connector 660 is disposed on second side 514 of module 500. Connector 660 is in electrical contact with fan units 320, 330, and 340. Connectors 640 and 660 are of a plug-in type which can be releaseably connected to power connection devices 650 and 670, respectively.

Power connection device 650 is internally disposed within apparatus 390. Power connection device 650 connects to conductor 578. Conductor 578 connects to a power bus (not shown in FIG. 4B) disposed within system 100 (FIG. 1). Power connection device 670 connects to conductor 579. Conductor 579 connects to a system-wide electrical ground (not shown in FIG. 4B) disposed within system 100 (FIG. 1). Power connection devices 650 and 670 are plug-in type connectors which can be releaseably connected with connectors 640 and 660, respectively.

When module 500 is removably disposed within temperature adjustment module receiving slot 392, connector 640 is releaseably connected to power connection device 650. In certain embodiments of Applicants' invention, connector 640 has a "male" configuration and power connection device 650 has a "female" configuration. In other embodiments, connector 640 has a "female" configuration and power connection device 650 has a "male" configuration.

Similarly, when module 500 is removably disposed within temperature adjustment module receiving slot 392, connector 660 is releaseably connected to power connection device 670. In certain embodiments of Applicants' invention, connector 660 has a "male" configuration and power connection device 670 has a "female" configuration. In other embodiments, connector 660 has a "female" configuration and power connection device 670 has a "male" configuration.

Figure 5:
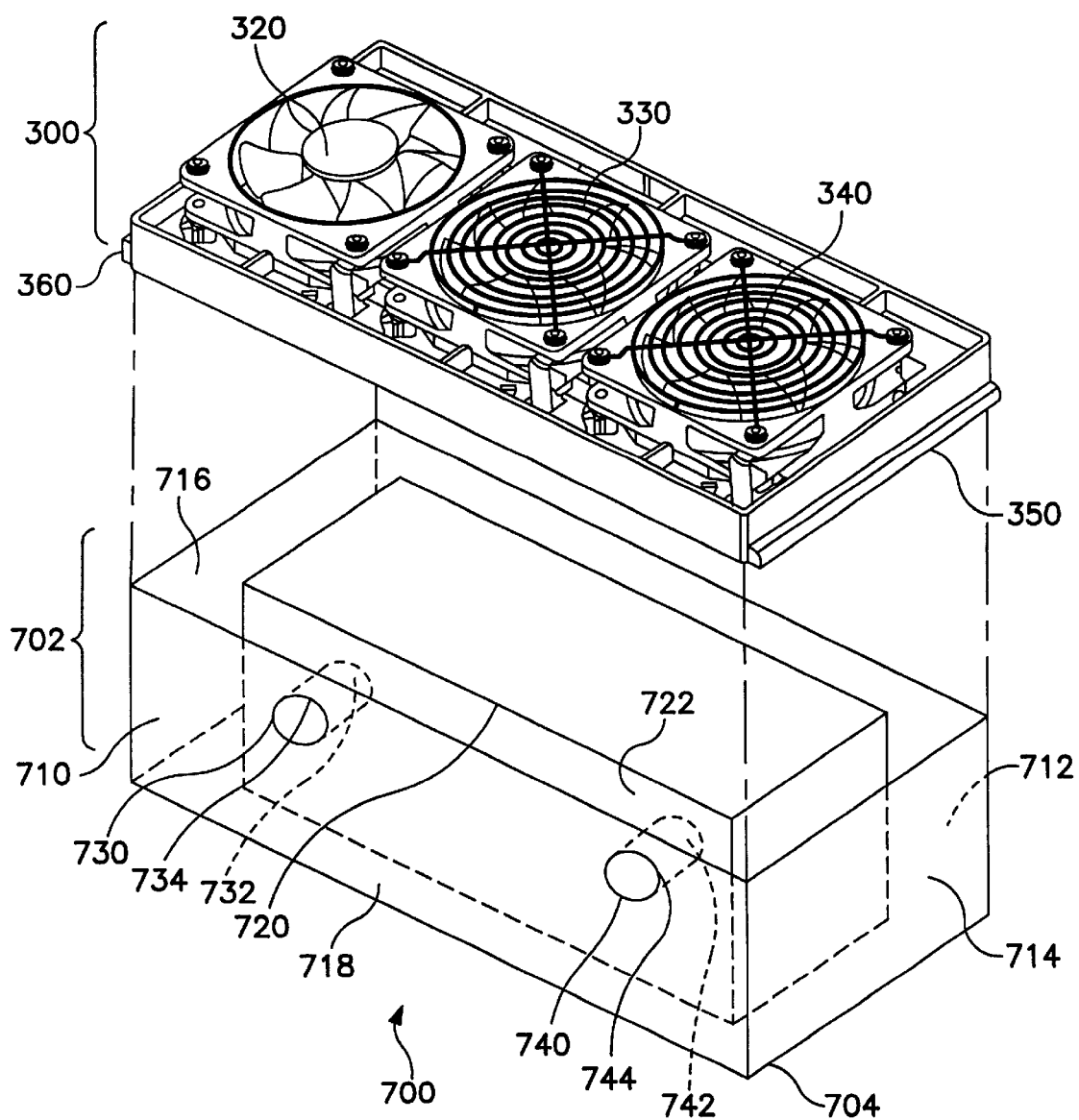
FIG. 5 is a perspective view of a third embodiment of Applicants' removable adjustment module.

FIG. 5 shows an alternative embodiment of Applicants' temperature adjustment module that includes a heat exchanger having input and output ports for input and output of circulating liquid 750 (not shown in FIG. 5). Temperature adjustment module 700 includes fan unit component 300 and heat exchanger component 702. In the embodiment shown in FIG. 5, fan unit component 300 includes fan units 320, 330, and 340. In other embodiments, temperature adjustment module 700 includes a fan unit component that includes a single fan unit or two fan units.

Heat exchanger component 702 includes enclosure 704 which is formed from first side 710 and opposing second side 712, third side 714 and opposing fourth side 716, and bottom 718. The descriptor "bottom" is used for descriptive purposes only, and should not be construed as limiting. Bottom 718 has a perforate design to facilitate movement of air through bottom 718, around heat exchanger 720, and through fan units 320, 330, and 340.

Heat exchanger 720 includes input port 730 and output port 740. Proximal end 732 of port 730 extends through side 722 and into the interior of heat exchanger 720. Distal end 734 releaseably connects to a source of cooled liquid (not shown in FIG. 5). U.S. Pat. No. 6,182,742 teaches an apparatus that circulates a cooled liquid to/from an electronic system, and is hereby incorporated by reference. Applicants' portable temperature adjustment module 700 comprises the "electronic system 100" shown in FIG. 1 of the '742 patent.

Proximal end 742 of output port 740 extends through side 722 and into the interior of heat exchanger 720. Distal end 744 of output port 740 releaseably connects to a cooling liquid return line. Circulating liquid 750 (not shown in FIG. 5) is provided by source 3000 shown in FIG. 1 of the '742 patent. Source 3000 adjusts the temperature of circulating liquid 750 to a first temperature T1. Circulating liquid 750 enters heat exchanger 720 through input port 730. Circulating liquid 750 flows through heat exchanger 720 thereby adjusting the exterior temperature of heat exchanger 720 to a second temperature T2. Circulating liquid 750 exits heat exchanger through output port 740 and is returned to source 3000.

Ambient air extant within system 100 has a third temperature T3. Source 3000 (FIG. 1 '742 patent) adjusts the rate at which circulating liquid 750 flows through heat exchanger 720, and controller 160 adjusts the rotation rate of fan blades 326, 336, and 346, to adjust the temperature of ambient air flowing around heat exchanger 732 to a fourth temperature T4. In certain embodiments T1 is less than T2, and T4 is less than T3. In other embodiments, T1 is greater than T2, and T4 is greater than T3.

In certain embodiments, distal end 734 of input port 730 is flush with the surface of side 722. In alternative embodiments, distal end 734 extends outwardly from side 722. In certain embodiments, distal end 744 of output port 740 is flush with the surface of side 722. In alternative embodiments, distal end 744 extends outwardly from side 722. In certain embodiments, distal end 734 is flush with the surface of side 722 and distal end 744 extends outwardly from side 722. In other embodiments, distal end 734 extends outwardly from side 722 and distal end 744 is flush with the surface of side 722.

Circulating liquid 750 comprises an aqueous-based fluid, a non-aqueous-based fluid, or a combination of both. Such non-aqueous based-fluids include compositions which are formed from chlorocarbons, fluorocarbons, chlorofluorocarbons, and combinations thereof.

Figure 6:
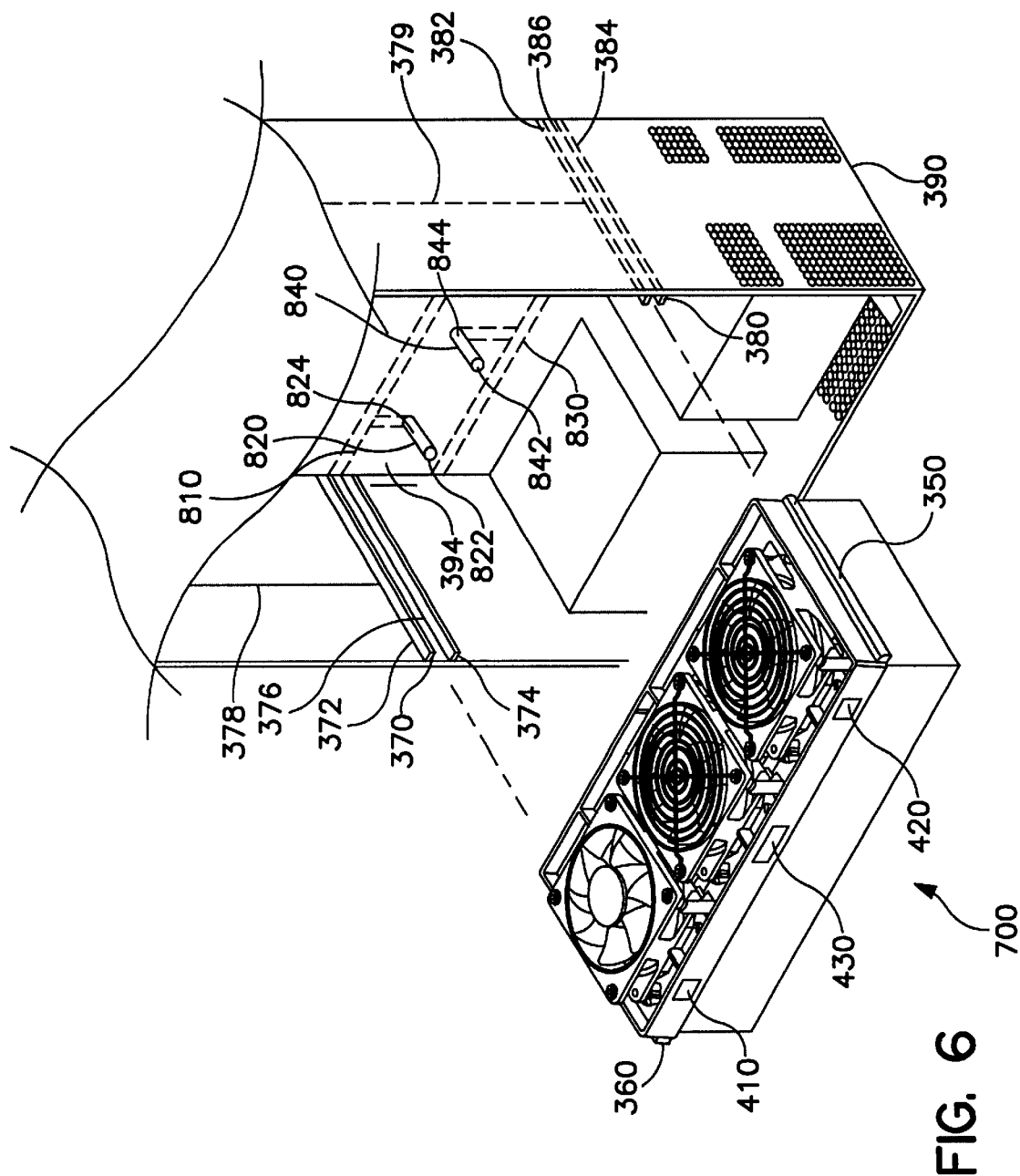
FIG. 6 is a perspective view of that third embodiment of Applicants' removable temperature adjustment module and its associated temperature adjustment module receiving slot

Referring to FIG. 6, connector 350 slidingly mates with assembly 380, and connector 360 slidingly mates with assembly 370. Assembly 370 in combination with assembly 380 formed temperature adjustment module receiving slot 392. In the embodiment shown in FIG. 6, power is supplied to module 700 via a power bus (not shown in FIG. 6) disposed within system 100 (FIG. 1), conductor 378, power connection device 370 releaseably connected to connector 360. Module 700 is grounded using connector 350 releaseably connected to power connection device 380, conductor 379, and a system-wide ground (not shown in FIG. 6) disposed within system 100 (FIG. 1).

In the embodiment shown in FIG. 6, circulating liquid supply device 820 is disposed on the back portion 394 of apparatus 390 with distal end 822 extending outwardly from back portion 394. Proximal end 824 connects to manifold 810 which supplies circulating liquid 750 (not shown in FIG. 6) from its source (not shown in FIG. 6).

Circulating liquid return device 840 is disposed on the back portion 394 of apparatus 390 with distal end 842 extending outwardly from back portion 394. Proximal end 844 connects to manifold 830 which returns circulating liquid 750 (not shown in FIG. 6) to its source (not shown in FIG. 6).

When temperature adjustment module 700 is removably disposed in temperature adjustment module receiving slot 392, distal end 822 of circulating liquid supply device 820 extends into, and is releaseably connected to, input port 730 (FIG. 5). The releaseable connection between distal end 822 and input port 730 is formed using Type-DC double check valve quick release couplings. These low-insertion force, quick release, Type-DC couplings comprise a socket unit which releaseably mates with a plug unit. In certain embodiments, distal end 822 comprises a socket unit and input port 730 includes a plug unit. In alternative embodiments, distal end 822 comprises a plug unit and input port 730 includes a socket unit.

Both the socket unit and the plug unit include self-sealing valves that seal instantly upon disconnection. When connected, the valve of the socket unit and the valve of the plug unit are pushed against one another, thereby, keeping the interior of the coupling open and allowing fluid flow. An O-ring disposed with the socket unit is forced against the outside of the plug unit thereby preventing leakage of fluid. Upon disconnection, the valves disposed within both the socket unit and the plug unit are each immediately pushed against their respective valve seats therefore effecting an immediate seal.

Similarly, when temperature adjustment module 700 is removably disposed in temperature adjustment module receiving slot 392, distal end 842 of circulating liquid return device 840 extends into, and is releaseably connected to, output port 740 (FIG. 5) using the above-described low insertion force, type-DC double check valve quick release couplings. In certain embodiments, distal end 842 comprises a socket unit and output port 740 includes a plug unit. In alternative embodiments, distal end 842 comprises a plug unit and output port 740 includes a socket unit.

Figure 7:
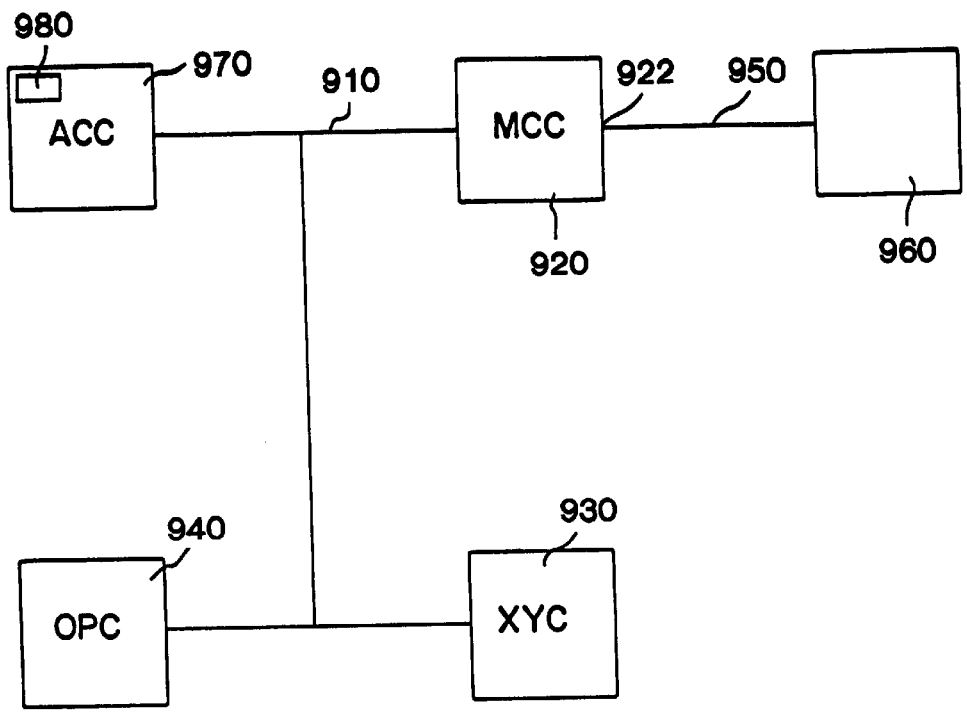
FIG. 7 is a schematic showing a first embodiment of the communication bus disposed within Applicants' automated data storage and retrieval system.

Referring to FIG. 7, serial protocol bus 910 disposed within Applicants' automated data storage and retrieval system (FIG. 1) is in communication with accessor control card 970, master communications control card 920, X/Y movement control card 930, and operator control panel control card 940. In certain embodiments of Applicants' invention serial protocol bus 910 comprises an ethernet protocol bus or a CANbus protocol bus. Those skilled in the art will appreciate that CANbus technology was developed in the automotive industry, but now has gained wide acceptance in other industries. In these CANbus embodiments, the features of bus 310 include 1 Mbit/s transmissions up to 40 meter bus length and 5 Kbit/s transmissions up to 1000 meter bus length. Accessor control card 970 includes memory buffer 980, and is disposed on accessor 110 (FIGS. 1, 2). X/Y movement control card 930 is disposed within system controller 160 (FIG. 1). Operator panel control card 940 is disposed within operator control panel 150 (FIG. 1).

Figure 8:
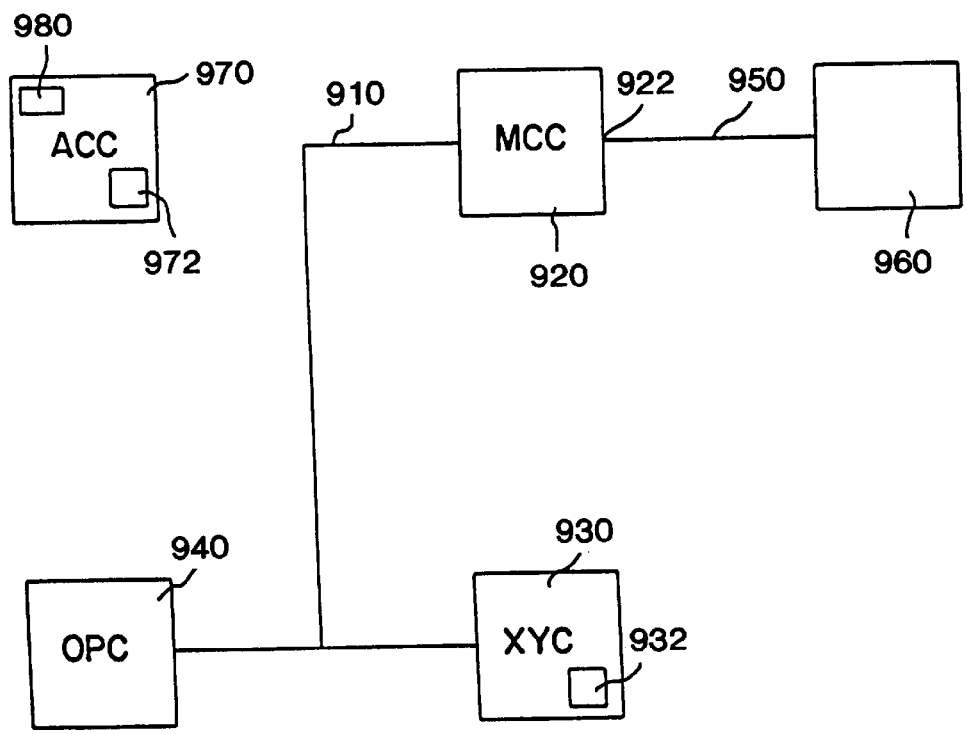
FIG. 8 is a schematic showing a second embodiment of the communication bus disposed within Applicants' automated data storage and retrieval system.

Referring to FIG. 8, in an alternative embodiment of Applicants' system X/Y movement control card 930 further includes wireless communication device 932, and accessor control card 970 further includes wireless communication device 972. In this wireless communication embodiment, X/Y control card 930 provides control commands by wireless communication to accessor 110 (FIGS. 1 and 2) via accessor control card 970 disposed within accessor 110. In certain embodiments of Applicants' invention, such wireless communication is conducted over frequencies between about 800 MHz and about 1.0 GHz. In other embodiments, such wireless communication is conducted using emissions within the infrared spectrum.

Master communication control card 920 includes external interface connection 922. Using external interface connection 922, the data stored in revolving memory buffer 980 resident on accessor control card 970 can be accessed by external computer 960. Communication link 950 connects external computer 960 and communication controller 920 via external interface connection 922. In various embodiments of Applicants' invention, communication link 950 comprises an RS 232 cable, a local area network, a private wide area network, a public wide area network, i.e. the Internet, and the like.

Figure 4B:
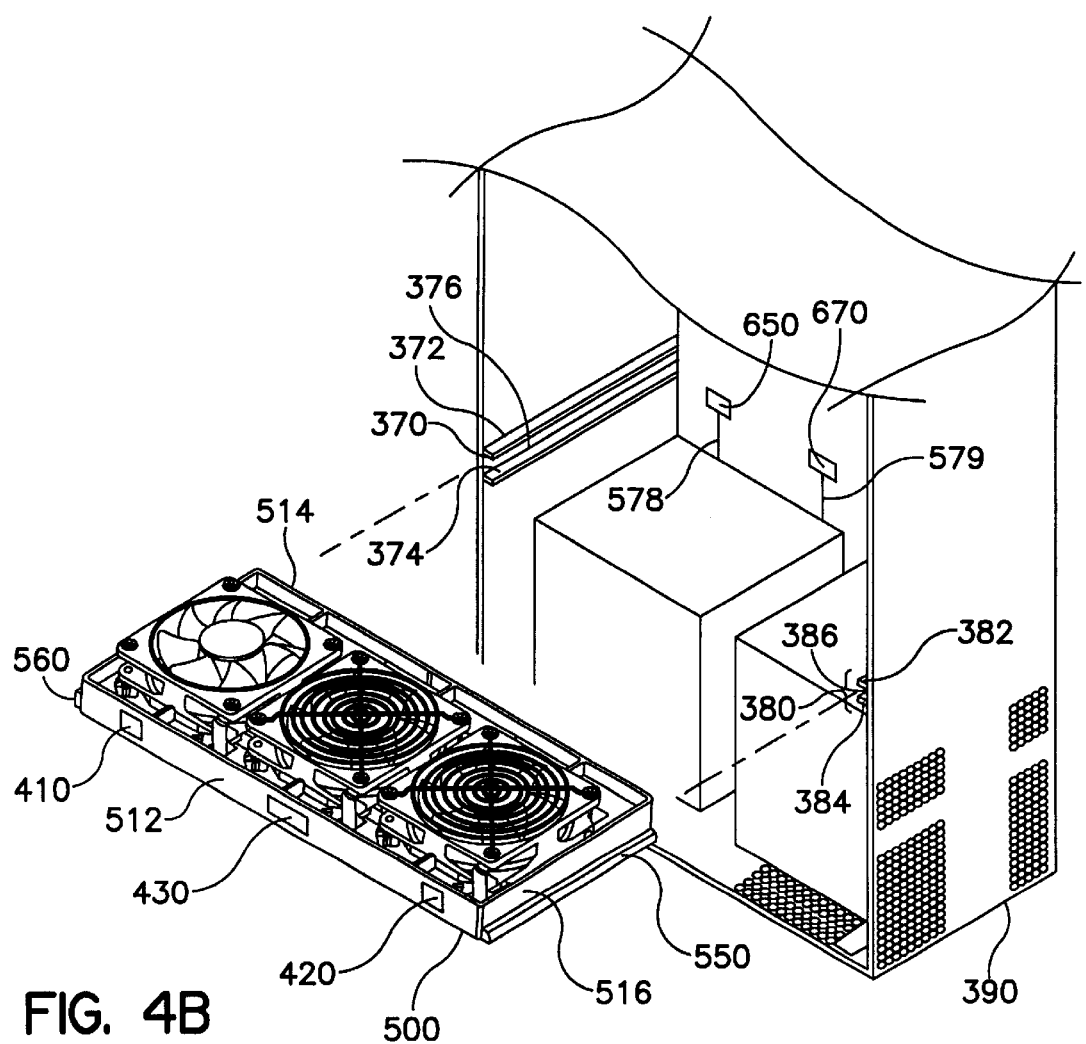
FIG. 4B is a perspective view of that second embodiment of Applicants' removable temperature adjustment module and its associated temperature adjustment module receiving slot.
Figure 9:
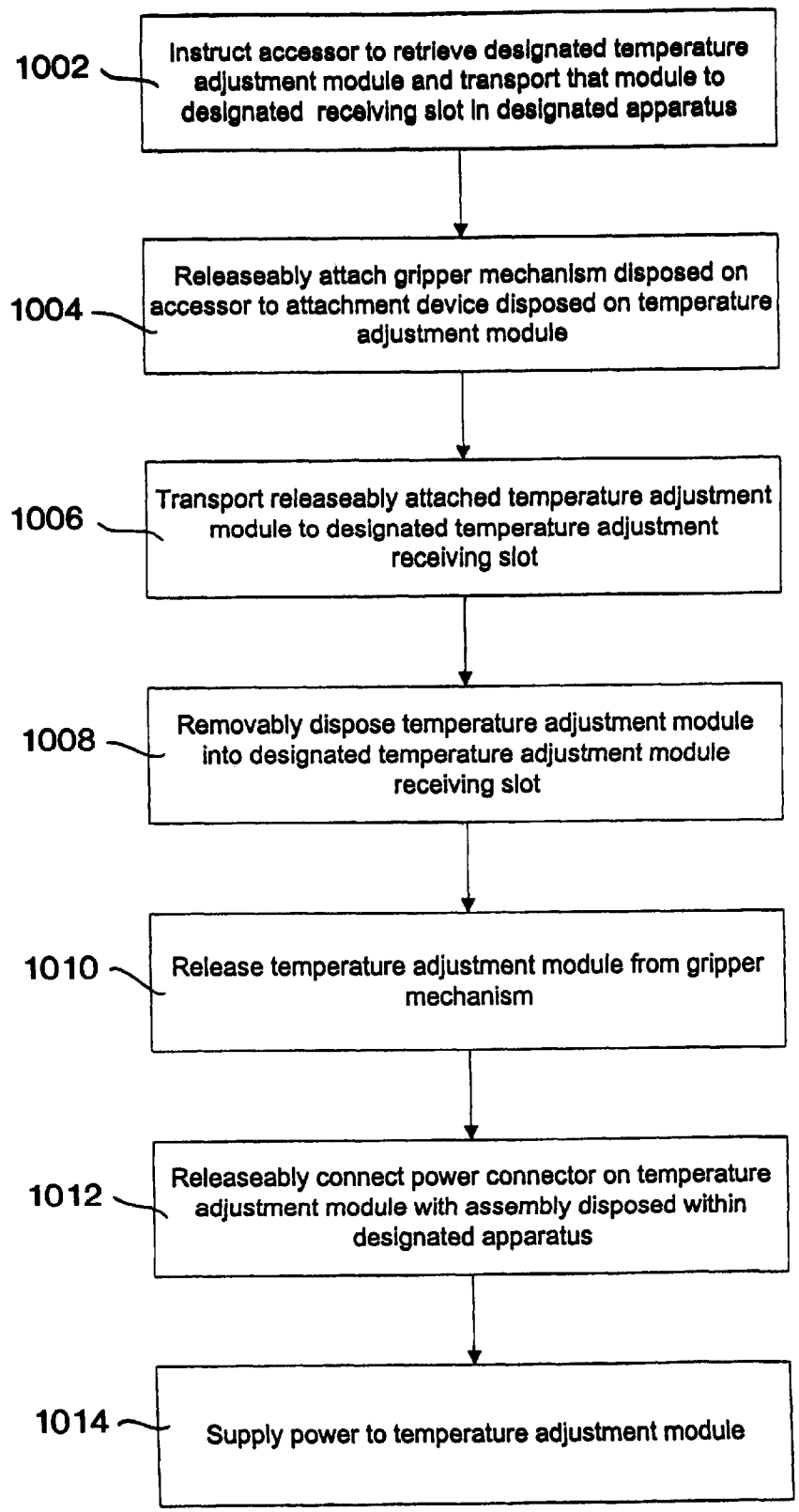
FIG. 9 is a flow chart summarizing the steps in Applicants' method to operate Applicants' temperature adjustment module.

Applicants' invention includes a method to removably dispose, and operate, Applicants' temperature adjustment module, such as module 300 (FIG. 3), module 500 (FIGS. 4A, 4B), or module 700 (FIGS. 5, 6) within automated data storage and retrieval system 100 (FIG. 1). FIG. 9 summarizes the steps in this method. In step 1002, X/Y movement controller 930 (FIG. 7) instructs an accessor movably disposed with the system, such as accessor 110 (FIGS. 1, 2), to retrieve a designated temperature adjustment module, such as temperature adjustment module 300 (FIG. 3), module 500 (FIGS. 4A, 4B), or module 700 (FIGS. 5, 6), from a storage slot, such as one of the storage slots disposed in first storage wall 102 (FIG. 1), and transport that designated temperature adjustment module to a designated temperature adjustment module receiving slot, such as slot 392 (FIG. 3), disposed in a designated apparatus 390 (FIGS. 3, 4B, 6). Such a designated apparatus includes data drive device 130 (FIG. 1), data drive device 140 (FIG. 1), operator control panel 150 (FIG. 1), accessor controller 160 (FIG. 1), power component 180 (FIG. 1), and/or power component 190 (FIG. 1).

In step 1004, the designated accessor attaches either gripper mechanism 214 (FIG. 2) or gripper mechanism 220 (FIG. 2) to attachment device 410 (FIG. 3) and/or attachment device 420 (FIGS. 3, 4B, 6) on power supply module 300 (FIG. 3), 500 (FIG. 4B), or 700 (FIG. 6), respectively. In step 1006, the designated accessor transports the releaseably attached designated temperature adjustment module to the designated temperature adjustment module receiving slot, such as slot 392 (FIG. 3) disposed in the designated apparatus 390 (FIGS. 3, 4B, 6). In step 1008, the designated accessor removably disposes the designated temperature adjustment module in the designated temperature adjustment module receiving slot. In step 1010, the designated accessor releases attachment device 410/420 from gripper mechanism 214.

In accord with step 1012, by removably disposing, for example, temperature adjustment module 300 (FIG. 3) in receiving slot 392 (FIG. 3), power connector 360 slidingly mates with assembly 370. Similarly, power connector 350 slidingly mates with assembly 380. In step 1014, power is supply to the designated temperature adjustment module now removably disposed within apparatus 390.

Figure 10:
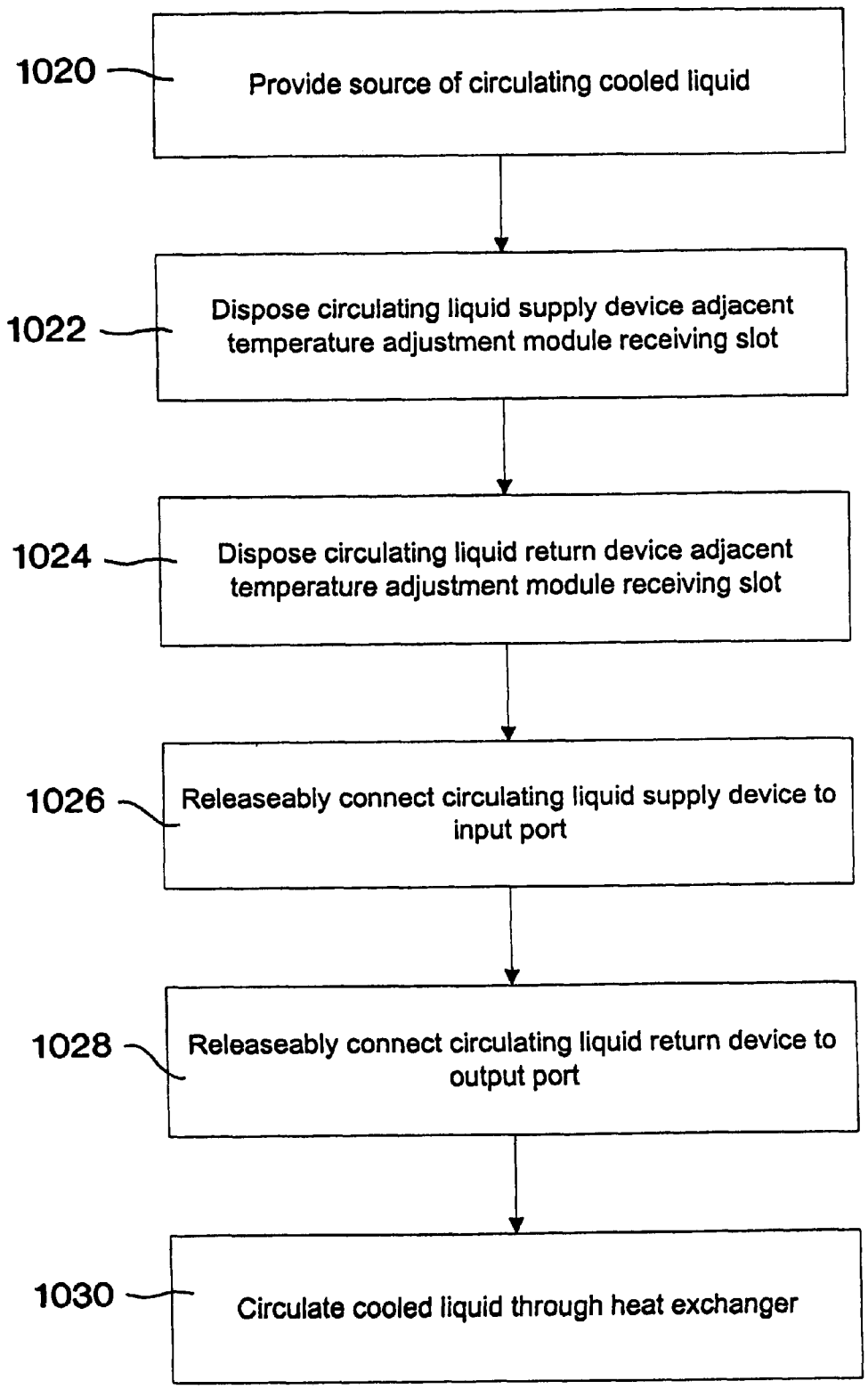
FIG. 10 is a flow chart summarizing additional steps in Applicants' method to operate Applicants' temperature adjustment module.

When removably disposing temperature adjustment module 700, certain additional steps are included in Applicants' method. Referring to FIG. 10, those additional steps include step 1020 wherein a source of circulating cooled liquid is provided within system 100 (FIG. 1). In step 1022, circulating liquid supply device 820 (FIG. 6) is disposed on side 394 (FIG. 6) of apparatus 390 (FIG. 6). In step 1024, circulating liquid return device 840 (FIG. 6) is disposed on side 394 (FIG. 6) of apparatus 390 (FIG. 6).

In step 1026, distal end 822 of circulating liquid supply device 820 is releaseably connected to input port 740 (FIG. 5) disposed on side 710 (FIG. 5) of heat exchanger portion 702 (FIG. 5) of temperature adjustment module 700 (FIG. 5). In step 1028, distal end 842 of circulating liquid return device 840 is releaseably connected to output port 730 disposed on side 710 (FIG. 5) of heat exchanger portion 702 (FIG. 5) of temperature adjustment module 700 (FIG. 5). In step 1030, circulating liquid 750 (not shown in FIGS.) is circulated through heat exchanger 720 (FIG. 5).

Applicants' automated data storage and retrieval system includes a computer useable medium having computer readable program code disposed therein for removably disposing, and operating, Applicants' portable temperature adjustment module with automated data storage and retrieval system 100 (FIG. 1). Applicants' computer readable program code comprises a series of computer readable program steps to monitor the internal temperatures of the various components disposed within Applicants' automated data storage and retrieval system.

Applicants' computer readable code further comprises a series of computer readable program steps to: instruct an accessor to retrieve a designated temperature adjustment module and transport that module to a designated temperature adjustment module receiving slot disposed in a designated apparatus by first attaching a gripper mechanism disposed on the designated accessor to an attachment device disposed on the designated temperature adjustment module, transport that releaseably attached temperature adjustment module to the designated temperature adjustment module receiving slot, insert the designated temperature adjustment module into the designated slot, release the designated temperature adjustment module from the gripper mechanism, and supply power to the designated temperature adjustment module.

Applicants' computer readable code further comprises a series of computer readable program steps to: releaseably connect a circulating liquid supply device to the input port connected to the heat exchanger portion of Applicants' temperature adjustment module, releaseably connect a circulating liquid return device to the output port connected to the heat exchanger portion of Applicants' temperature adjustment module; adjust the rate of flow of circulating liquid through the heat exchanger portion of Applicants' temperature adjustment module; and adjust the rate of flow of ambient air around that heat exchanger.

Figure 11:
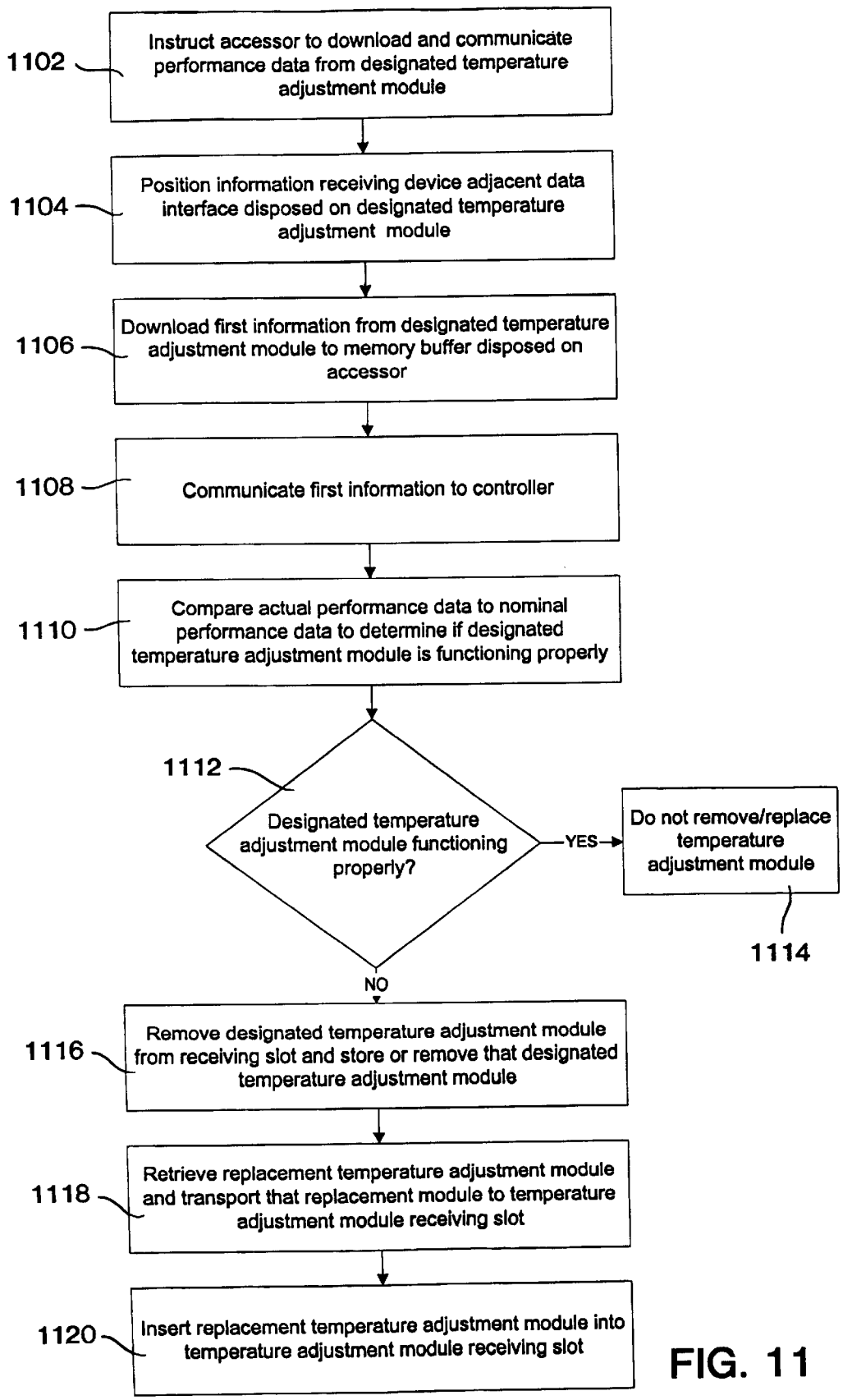
FIG. 11 is a flow chart summarizing the steps in Applicants' method to monitor the performance of Applicants' removable temperature adjustment module while that module is operating in Applicants' automated data storage and retrieval system.

Applicant's invention includes a method to evaluate the operational performance of a temperature adjustment module removeably disposed within an apparatus located within Applicants' automated data storage and retrieval system. FIG. 11 summarizes the steps in Applicants' method.

In step 1102, the X/Y controller 930 (FIGS. 7, 8) instructs accessor 110 (FIG. 1) to download and store in memory buffer 980 (FIGS. 7, 8) first information, such as actual performance data, from a designated temperature adjustment module, such as temperature adjustment module 700 (FIGS. 5, 6), and communicate that first information to master communication controller 920 (FIGS. 7, 8). Such first information includes: temperature of the ambient air beneath heat exchanger portion 702; temperature of the air exhausted by fan units 320, 330, and 340 (FIG. 5); temperature of circulating liquid 750 entering heat exchanger 720 via input port 740; temperature of circulating liquid 750 exiting heat exchanger 720 via output port 730; surface temperatures of heat exchanger 720; power consumption of fan units 320, 330, and/or 340; blade rotation speeds for the fan units 320, 330, and/or 340; and the like.

In step 1104, accessor 110 is positioned such that information receiving device 214 (FIG. 2) is disposed adjacent data interface 430 (FIG. 6) disposed on temperature adjustment module 700. In step 1106 first information is downloaded from temperature adjustment module 700 to memory buffer 980 (FIGS. 7, 8). In step 1108, that first information is communicated to master communication controller 920. In the embodiment shown in FIG. 7, that first information is communicated via serial data bus 910. In the embodiment shown in FIG. 8, that first information is communicated by accessor 110 to X/Y controller 930 using wireless communication devices 932 and 972. In this embodiment, X/Y controller 930 then communicates the first information to master communication controller 920 via bus 910.

In step 1110, the first information is compared to second information, such as desired or nominal performance specifications. In step 1112 the performance of temperature adjustment module 700 is determined to be either acceptable or unacceptable. If the performance is acceptable, then temperature adjustment module 700 is not removed and replaced.

On the other hand, if the performance of temperature adjustment module 700 is determined to be unacceptable in step 1112, then in step 1116 temperature adjustment module 700 is removed from temperature adjustment receiving slot 392. Malfunctioning temperature adjustment module 700 is then either stored in one of the storage slots disposed in first storage wall 102 (FIG. 1) or second storage wall 104 (FIG. 1), or in the alternative, temperature adjustment module 700 is transport to import/export port 172 (FIG. 1) and is removed from system 100. In step 1118, accessor 110 is instructed to retrieve a replacement temperature adjustment module from storage, and to transport that replacement temperature adjustment module to temperature adjustment module receiving slot 392. In step 1120, the replacement temperature adjustment module is inserted into temperature adjustment receiving slot 392.

In an alternative embodiment, accessor 110 is instructed to retrieve a replacement temperature adjustment module prior to monitoring the performance of temperature adjustment module 700. In this embodiment, the replacement temperature adjustment module is, for example, removably attached to first gripper mechanism 214 (FIG. 2). Subsequently, second gripper mechanism 220 (FIG. 2) is attached to temperature adjustment module 700 and removes that module from temperature adjustment receiving slot 392. Lifting servo section 218 (FIG. 2) then rotate, and first gripper mechanism 214 inserts the replacement temperature adjustment module into the now-vacant temperature adjustment module receiving slot 392. Accessor 110 then either stores malfunctioning temperature adjustment module 700 in a storage slot disposed in first wall 102/second wall 104 (FIG. 1), or delivers temperature (FIG. 1) for removal from system 100.

Applicants' automated data storage and retrieval system includes a computer useable medium having computer readable program code disposed therein for evaluating the performance of Applicants' temperature adjustment modules removable disposed within Applicants' system. Applicants' computer readable program code comprises a series of computer readable program steps to evaluate the performance of a temperature adjustment module removable disposed within Applicants' system while that module is in operation. Applicants' computer readable code further comprises a series of computer readable program steps to: instruct an accessor to download, store, and communicate first information, such as performance data, from a designated temperature adjustment module to a controller, to evaluate that first information in order to determine if that designated temperature adjustment module is functioning properly, and to remove and replace that designated temperature adjustment module in the event that module is not performing properly.

While the preferred embodiments of the present invention have been illustrated in detail, it should be apparent that modifications and adaptations to those embodiments may occur to one skilled in the art without departing from the scope of the present invention as set forth in the following claims.

We claim:

1. A temperature adjustment module removably disposed in an automated data storage and retrieval system, said automated data storage and retrieval system comprising one or a plurality of power connection devices and one or a plurality of accessors for accessing and transporting said temperature adjustment module, wherein said one or more accessors each comprises a gripper mechanism, said temperature adjustment module comprising:

a frame having a first side and a second side;

one or more fan units disposed within said frame;

a first attachment device disposed on said frame, wherein said first attachment device can be releaseably attached to said gripper mechanism;

a connector disposed on said frame and connected to said one or more fan units, wherein said connector can be releaseably connected to one of said one or a plurality of power connection devices.

2. The temperature adjustment module of claim 1, wherein each of said one or a plurality of power connection devices comprises a power connection device component and a data connection device component, and wherein said connector can be releaseably connected to said power connection device component and to said data connection device component of said one of said one or a plurality of power connection devices.

3. The temperature adjustment module of claim 1, further comprising a second attachment device disposed on said frame, wherein said second attachment device can be releaseably attached to said gripper mechanism.

4. The temperature adjustment module of claim 1, wherein said first attachment device and said second attachment device are disposed on said first side, and wherein said connector is disposed on said second side.

5. The temperature adjustment module of claim 1, wherein said one or more accessors each further comprises an information receiving device, and wherein said temperature adjustment module further comprises a data interface disposed on said frame, such that when said temperature adjustment supply module is releaseably attached to said gripper mechanism, said information receiving device is disposed adjacent said data interface.

6. The temperature adjustment module of claim 5, wherein said data interface is disposed on said first side.

7. The temperature adjustment module of claim 1, wherein said automated data storage and retrieval system further comprises a source of a circulating liquid, one or a plurality of circulating liquid supply devices, and one or a plurality of circulating liquid return devices, said temperature adjustment module further comprising:

an enclosure disposed adjacent said frame;

a heat exchanger disposed within said enclosure;

a circulating liquid input port connected to said heat exchanger, wherein said circulating liquid input port can be releaseably connected to one of said one or plurality of circulating liquid supply devices; and a circulating liquid output port connected to said heat exchanger, wherein said circulating liquid output port can be releaseably connected to one of said one or plurality of circulating liquid return devices.

8. An automated data storage and retrieval system for storing and accessing a plurality of portable data storage media stored in a plurality of storage slots, said automated data storage and retrieval system having at least one data storage drive for receiving said portable data storage media and reading and/or writing data thereon, and one or more accessors moveably disposed therein, wherein each of said one or more accessors comprises a gripper mechanism, said automated data storage system comprising:

one or a plurality of temperature adjustment module receiving slots;

one or a plurality of power connection devices, wherein one of said one or a plurality of power connection devices is disposed adjacent each of said one or a plurality of temperature adjustment module receiving slots;

one or a plurality of temperature adjustment modules removably disposed in said one or a plurality of temperature adjustment module receiving slots;

wherein each of said one or a plurality of temperature adjustment modules is releaseably connected to one of said one or a plurality of power connection devices.

9. The automated data storage and retrieval system of claim 8, wherein each of said one or a plurality of power connection devices comprises a power connection device component and a data connection device component.

10. The automated data storage and retrieval system of claim 8, wherein each of said one or a plurality of temperature adjustment modules comprises:

a frame having a first side and a second side;

one or more fan units disposed within said frame;

a first attachment device disposed on said frame, wherein said first attachment device can be releaseably attached to said gripper mechanism; and a connector disposed on said frame and connected to said one or more fan units, wherein said connector can be releaseably connected to one of said one or a plurality of power connection devices.

11. The automated data storage and retrieval system of claim 10, wherein each of said one or a plurality of temperature adjustment modules further comprises a second attachment device disposed on said frame, wherein said second attachment device can be releaseably attached to said gripper mechanism.

12. The automated data storage and retrieval system of claim 10, wherein said automated data storage and retrieval system further comprises a source of a circulating liquid, one or a plurality of circulating liquid supply devices, and one or a plurality of circulating liquid return devices, and wherein each of said one or a plurality of temperature adjustment module further comprises:

an enclosure disposed adjacent said frame;

a heat exchanger disposed within said enclosure;

a circulating liquid input port connected to said heat exchanger, wherein said circulating liquid input port can be releaseably connected to one of said one or plurality of circulating liquid supply devices; and a circulating liquid output port connected to said heat-exchanger, wherein said circulating liquid output port can be releaseably connected to one of said one or plurality of circulating liquid return devices.

13. The automated data storage and retrieval system of claim 8, wherein said one or a plurality of accessors each further comprises an information receiving device disposed on said gripper mechanism, and wherein each of said one or a plurality of temperature adjustment modules further comprises a data interface disposed on said frame, such that when one of said one or a plurality of temperature adjustment modules is releaseably attached to said gripper mechanism disposed on one of said one or a plurality of accessors, said information receiving device disposed on said one of said one or a plurality of accessors is disposed adjacent said data interface disposed on said one of said one or a plurality of temperature adjustment modules.

14. A method for operating a temperature adjustment module in an automated data storage and retrieval system, wherein said automated data storage and retrieval system includes a power source providing power to one or a plurality of power connection devices and one or a plurality of temperature adjustment module receiving slots, said method comprising the steps of:

providing a portable temperature adjustment module;

removably disposing said temperature adjustment module in one of said one or a plurality of temperature adjustment module receiving slots; and supplying said power to said temperature adjustment module.

15. The method of claim 14, wherein said temperature adjustment module comprises:

a frame having a first side and a second side;

one or more fan units disposed within said frame;

an attachment device disposed on said frame;

a connector disposed on said frame and connected to said one or more fan units, wherein said first connector can be releasably connected to one of said one or a plurality of power connection devices.

16. The method of claim 15, wherein said automated data storage and retrieval system further comprises one or a plurality of robotic accessors moveably disposed therein, each of said one or a plurality of accessors comprising a gripper mechanism, wherein said removably disposing step further comprises the steps of:

attaching said gripper mechanism disposed on one of said one or a plurality of accessors to said attachment device disposed on said temperature adjustment module;

transporting said temperature adjustment module to said one of said one or a plurality of temperature adjustment module receiving slots;

removably inserting said temperature adjustment module into said one of said one or a plurality of power supply module receiving slots;

releaseably connecting said connector to one of said one or a plurality of power connection devices; and releasing said attachment device from said gripper mechanism.

17. The method of claim 15, wherein said automated data storage and retrieval system further comprises a source of a circulating liquid, one or a plurality of circulating liquid supply devices connected to said source of a circulating liquid, and one or a plurality of circulating liquid return devices connected to said source of a circulating liquid, and wherein said temperature adjustment module further comprises:

an enclosure disposed adjacent said frame;

a heat exchanger disposed within said enclosure;

a circulating liquid input port connected to said heat exchanger;

wherein said method further comprises the steps of:

releaseably connecting said circulating liquid input port to one of said one or plurality of circulating liquid supply devices;

releaseably connecting said circulating liquid output port to one of said one or plurality of circulating liquid return devices;

adjusting the flow of said circulating liquid through said heat exchanger; and adjusting the flow of air around said heat exchanger.

18. A method to monitor the operation of a first temperature adjustment module removably disposed in a temperature adjustment module receiving slot disposed within an automated data storage and retrieval system, said first temperature adjustment module comprising a frame, a data interface disposed on said frame, and an attachment device disposed on said frame, said automated data storage system comprising one or a plurality of accessors moveably disposed therein, wherein each of said one or a plurality of accessors comprises a gripper mechanism, an information receiving device, and wherein each of said one or a plurality of accessors is in communication with a controller, said method comprising the steps of:

positioning the information receiving device disposed on one of said one or a plurality of accessors adjacent said data interface disposed on said first temperature adjustment module;

communicating first information from said first temperature adjustment module to said accessor;

communicating said first information from said accessor to said controller; and analyzing said first information.

19. The method of claim 18, wherein said accessor further comprises a memory buffer, said method further comprising the step of storing said first information in said memory buffer.

20. The method of claim 18, wherein said analyzing step further comprises the steps of:

providing second information;

generating a comparison between said first information and said second information; and determining the performance of said first temperature adjustment module based upon said comparison.

21. The method of claim 18, further comprising the steps of:

releaseably attaching the gripper mechanism disposed on said one of said one or a plurality of accessors to said attachment device;

removing said first temperature adjustment module from said temperature adjustment module receiving slot;

retrieving a second temperature adjustment module; and inserting said second temperature adjustment module into said temperature adjustment module receiving slot.

22. The method of claim 21, wherein said automated data storage and retrieval system further comprises a plurality of storage slots, said method further comprising the step of storing said first power supply module in one of said plurality of storage slots.

23. The method of claim 21, wherein said automated data storage and retrieval system further comprises an import/export port, said method further comprising the step of removing said first power supply module from said automated data storage and retrieval system via said import/export port.

24. An automated data storage and retrieval system comprising a computer useable medium having computer readable program code disposed therein for operating a temperature adjustment module removably disposed within said automated data storage and retrieval system, wherein said automated data storage and retrieval system comprises ambient air, a power source providing power to one or a plurality of power connection devices, and one or a plurality of temperature adjustment module receiving slots, the computer readable program code comprising a series of computer readable program steps to effect:

removably disposing a temperature adjustment module in one of said one or a plurality of temperature adjustment module receiving slots, wherein said temperature adjustment module comprises a frame and one or more fan units disposed within said frame;

supplying said power to said one or more fan units; and moving said ambient air through said temperature adjustment module.

25. The automated data storage and retrieval system of claim 24, wherein said automated data storage and retrieval system further comprises one or a plurality of accessors moveably disposed therein, each of said one or a plurality of accessors comprising a gripper mechanism, and wherein said temperature adjustment module further comprises an attachment device disposed on said enclosure and a connector disposed on said enclosure and connected to said temperature adjustment apparatus, said computer readable program code further comprising a series of computer readable program steps to effect:

releaseably attaching the gripper mechanism disposed on one of said one or a plurality of accessors to said attachment device;

transporting said temperature adjustment module to said one of said one or a plurality of temperature adjustment module receiving slots;

releaseably inserting said temperature adjustment module into said one of said one or a plurality of temperature adjustment module receiving slots;

releaseably connecting said connector to one of said one or a plurality of power connection devices; and releasing said attachment device from said gripper mechanism.

26. The automated data storage and retrieval system of claim 24, wherein said automated data storage and retrieval system further comprises a source of a circulating liquid, one or a plurality of circulating liquid supply devices connected to said circulating liquid source, and one or a plurality of circulating liquid return devices connected to said circulating liquid source, and wherein said temperature adjustment module further comprises:

an enclosure disposed adjacent said frame;

a heat exchanger disposed within said enclosure;

a circulating liquid input port connected to said heat exchanger;

a circulating liquid input port connected to said heat exchanger;

wherein said computer readable program code further comprising a series of computer readable program steps to effect:

releaseably connecting said circulating liquid input port to one of said one or plurality of circulating liquid supply devices;

releaseably connecting said circulating liquid output port to one of said one or plurality of circulating liquid return devices;

adjusting the rate of flow of circulating liquid through said heat exchanger; and adjusting the rate of flow of ambient air around said heat exchanger.

27. An automated data storage and retrieval system comprising a computer useable medium having computer readable program code disposed therein to monitor operation of a first temperature adjustment module removably disposed within a temperature adjustment module receiving slot disposed in said automated data storage and retrieval system, said first temperature adjustment module comprising a data interface and an attachment device, said automated data storage system comprising one or a plurality of accessors moveably disposed therein, wherein each of said one or a plurality of accessors comprises a gripper mechanism and an information receiving device, and wherein each of said accessors is in communication with a controller, the computer readable program code comprising a series of computer readable program steps to effect:

positioning the information receiving device disposed on one of said one or a plurality of accessors adjacent said data interface disposed on said first temperature adjustment module;

communicating first information from said first temperature adjustment supply module to said accessor;

communicating said first information from said accessor to said controller; and analyzing said first information.

28. The automated data storage and retrieval system of claim 27, wherein said accessor further comprises a memory buffer, said computer readable program code further comprising a series of computer readable program steps to effect storing said first information in said memory buffer.

29. The automated data storage and retrieval system of claim 27, the computer readable program code further comprising a series of computer readable program steps to effect:

providing second information;

generating a comparison between said first information and said second information; and determining the performance of said temperature adjustment module based upon said comparison.

30. The automated data storage and retrieval system of claim 27, the computer readable program code further comprising a series of computer readable program steps to effect:

releaseably attaching the gripper mechanism disposed on said one of said one or a plurality of accessors to said attachment device;

removing said first temperature adjustment module from said power supply module receiving slot;

retrieving a second temperature adjustment module;

inserting said second temperature adjustment module into said temperature adjustment module receiving slot.

31. The automated data storage and retrieval system of claim 30, wherein said automated data storage and retrieval system further comprises a plurality of storage slots, and wherein said computer readable program code further comprises a series of computer readable program steps to effect storing said first power supply module in one of said plurality of storage slots.

32. The method of claim 30, wherein said automated data storage and retrieval system further comprises an import/export port, and wherein said computer readable program code further comprises a series of computer readable program steps to effect removing said first power supply module from said automated data storage and retrieval system via said import/export port.

33. An accessor moveably disposed within an automated data storage and retrieval system, wherein said automated data storage and retrieval system includes one or more temperature adjustment modules removably disposed therein, each of said one or more temperature adjustment modules comprising an attachment device, said accessor comprising a gripper mechanism, wherein said gripper mechanism can be releaseably attached to said attachment device.

34. The accessor of claim 33, wherein each of said one or a plurality of temperature adjustment modules further comprises a data interface, and wherein said accessor further comprises an information receiving device disposed on said gripper mechanism such that when said attachment device is releaseably connected to said gripper mechanism said information receiving device is disposed adjacent said data interface.

35. The accessor of claim 34, further comprising an accessor control card and a memory buffer disposed on said accessor control card, wherein said information receiving device is connected to said memory buffer.

36. The accessor of claim 35, further comprising a wireless communication device, wherein said wireless communication device is connected to said accessor control card.

* * * * *